E. R. CALTHROP.
PARACHUTE.
APPLICATION FILED SEPT. 8, 1919.

1,393,082.

Patented Oct. 11, 1921.
3 SHEETS—SHEET 1.

Everard Richard Calthrop.
INVENTOR

By Laurence Langner
ATTORNEY.

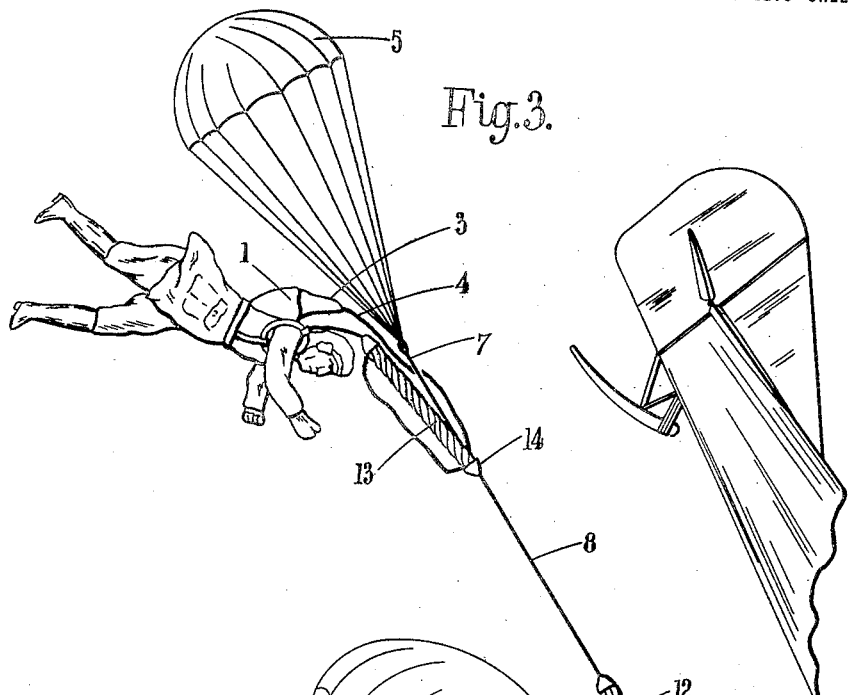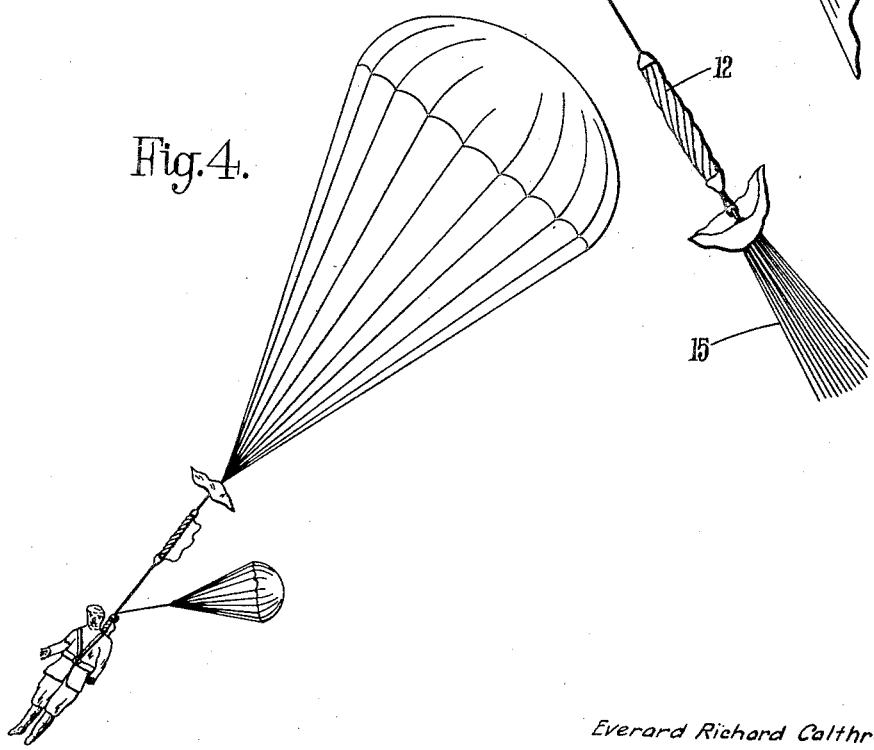

UNITED STATES PATENT OFFICE.

EVERARD RICHARD CALTHROP, OF LONDON, ENGLAND, ASSIGNOR TO E. R. CALTHROP'S AERIAL PATENTS LIMITED, OF LONDON, ENGLAND.

PARACHUTE.

1,393,082.  Specification of Letters Patent.  Patented Oct. 11, 1921.

Application filed September 8, 1919. Serial No. 322,497.

*To all whom it may concern:*

Be it known I, EVERARD RICHARD CALTHROP, a subject of the King of Great Britain, residing at London, in the county of Middlesex, England, have invented new and useful Improvements Relating to Parachutes, of which the following is a specification.

This invention has reference to parachutes of the kind which are carried by aerial craft in a folded or nested condition and adapted to be launched by the application of the weight of the aviator or other load.

More particularly the invention relates to parachutes of the aforesaid kind carried by aeroplanes and like machines and the primary object of the invention is to provide improved means for insuring the effective launching of the parachute in the event of the action of gravity tending to prevent the load from extracting the parachute from its container as for instance when an aeroplane is making a nose-dive.

In its broadest aspect my invention may be said to consist in the provision of means operable automatically or manually by the aviator whereby as he throws himself from the aeroplane sufficient resistance will be created in a nose-dive to release the parachute from its container.

More specifically stated the invention consists of an auxiliary parachute adapted to be carried upon the person of the aviator and to be expanded as he throws himself from the machine in such a manner as to create sufficient resistance in a nose-dive to launch the main or load-supporting parachute.

In order that the said invention may be readily understood and carried into effect same will now be more fully described with reference in the accompanying drawings:—

Fig. 3 represents the auxiliary or resistance parachute abstracted from its knapsack or pocket and expanded by the air current and the main or load-supporting parachute in the act of being launched from its container.

Fig. 4 shows the aviator supported by the main parachute and also illustrating the action of the auxiliary parachute during descent.

Fig. 5 illustrates a modification of my invention hereinafter more particularly referred to.

Figure 1:
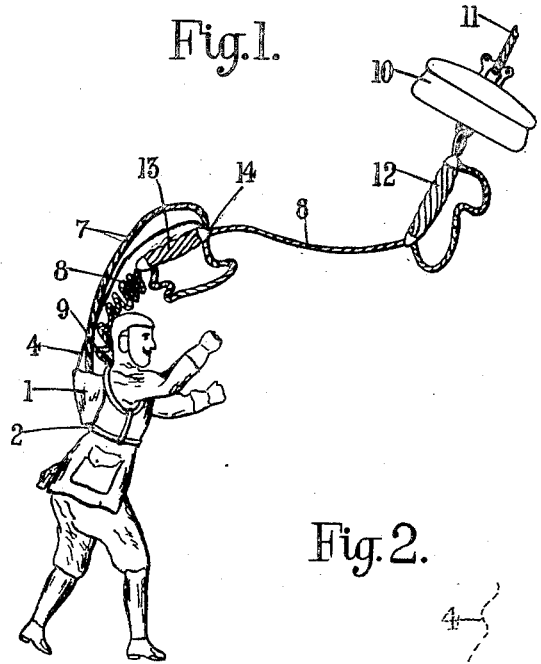
Figure 1 is a view illustrating my improved parachute launching device the aviator being depicted in the position he will assume immediately upon jumping from an aeroplane in a nose-dive.
Figure 2:
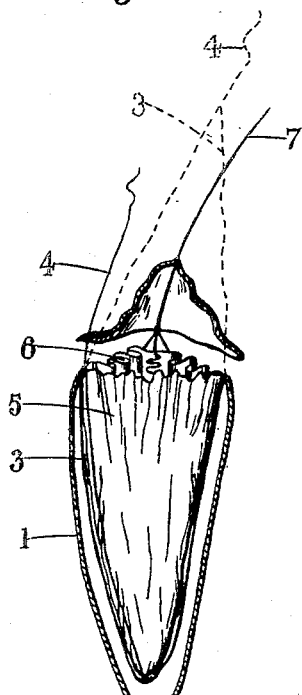
Fig. 2 is a sectional view of the knapsack or pocket hereinafter more particularly described.

Referring now to Figs. 1 and 2 the numeral 1 indicates a knapsack or pocket attached to the back of the aviator such as by being secured to the usual harness 2. Said knapsack is provided with a flexible lining 3 adapted to be turned inside out when a pull is exerted upon the cord 4 as will be presently explained. Compactly housed within the lining 3 is a small auxiliary parachute 5 the rigging cords or tapes 6 of which are connected by a cord or the like 7 to the load rope 8 which is of course positively attached to the aviator's harness 2 as at 9 and to the main parachute which is here represented by way of example as of the type adapted to be launched from container 10 positively secured by the rope 11 to the aircraft (not shown). The usual shock absorbing device 12 commonly employed with parachutes of the aforesaid type is interposed in the load rope 8 and in accordance with the present invention I provide a second shock absorber 13 interposed in said load rope the function of which will appear when the operation of my improved device which I will now proceed to describe is considered.

The main or load supporting parachute in its container and represented as a whole by the numeral 10 having been attached in the desired location to the aircraft by its rope 11 the main suspension rope 8 is connected to the aviator's harness 2 at the point 9. The auxiliary parachute 5 is packed in the knapsack or pocket 1 carried by the aviator and the cord 7 to which the rigging tapes 6 of the auxiliary parachute 5 are attached is positively connected to the load rope 8 at the point 14 that is to say at that end of the shock absorber device 13 remote from the aviator. The cord 4 by means of which the aforesaid lining 3 is turned inside out is likewise connected to the same point.

On the machine making a nose-dive or assuming such other position in which gravity would tend to prevent the weight of the load from launching the main parachute immediately the aviator throws himself from the aeroplane the shock absorber 13 which is of a resilient character will be stretched by his weight and the cord 4—the length of which is determined so as to bring about the desired result—will thereupon pull the lining 3 out of the knapsack 1 thus throwing the auxiliary parachute 5 into the air. The air current will cause the auxiliary parachute 5 to exert sufficient resistance to launch the main or load supporting parachute from its container said parachute taking on the speed of the air current and propeller slip-stream if the latter exists so that it instantly passes the aviator expands above him and supports him safely in his descent to the ground.

Fig. 3 is intended to represent the relative positions of the aviator and the auxiliary parachute at the moment when this latter is fully expanded and exerting the requisite resistance upon the rigging 15 of the main or load supporting parachute to abstract it from its container.

Fig. 4 illustrates the main parachute supporting the aviator in his descent to the ground at landing speed and it will be observed that the auxiliary parachute 5 will act as an arrester of reciprocating and circular swing of the aviator thereby steadying the main parachute.

In the above described arrangement the projection of the auxiliary parachute 5 is brought about automatically by the pull upon the cord 4 when the weight of the load is exerted upon the resilient extensible shock absorber device 13 but it is obvious that the auxiliary parachute may be under the direct control of the aviator. For this purpose the cord 4 may be passed over the aviator's shoulder and secured to his belt or otherwise so as to be within easy reach to enable him to turn the aforesaid lining 3 inside out and so throw the auxiliary parachute into the air. Such an arrangement may be used in place of attaching the aforementioned cord 4 to the load rope 8 or it may be employed in addition thereto that is to say one cord 4 may be attached as described with reference to Fig. 1 and an additional cord led over the aviator's shoulder.

It is of course obvious that the knapsack 1 may be arranged in front of the aviator instead of being attached to his back. In either case the operation of the device is precisely the same.

In place of the resilient shock absorber device 13 I may simply loop the load rope 8 below the point 14 at which the cord 4 is attached and bridge said loop by means of a rupturable connection which will be broken when the weight of the load is exerted thereon. The result of this will be similar to employing a resilient extensible element below the point 14 namely to increase the effective length of the rope 8 between the points 14 and 9 and thus cause the cord to turn the lining 3 inside out.

Figure 5:
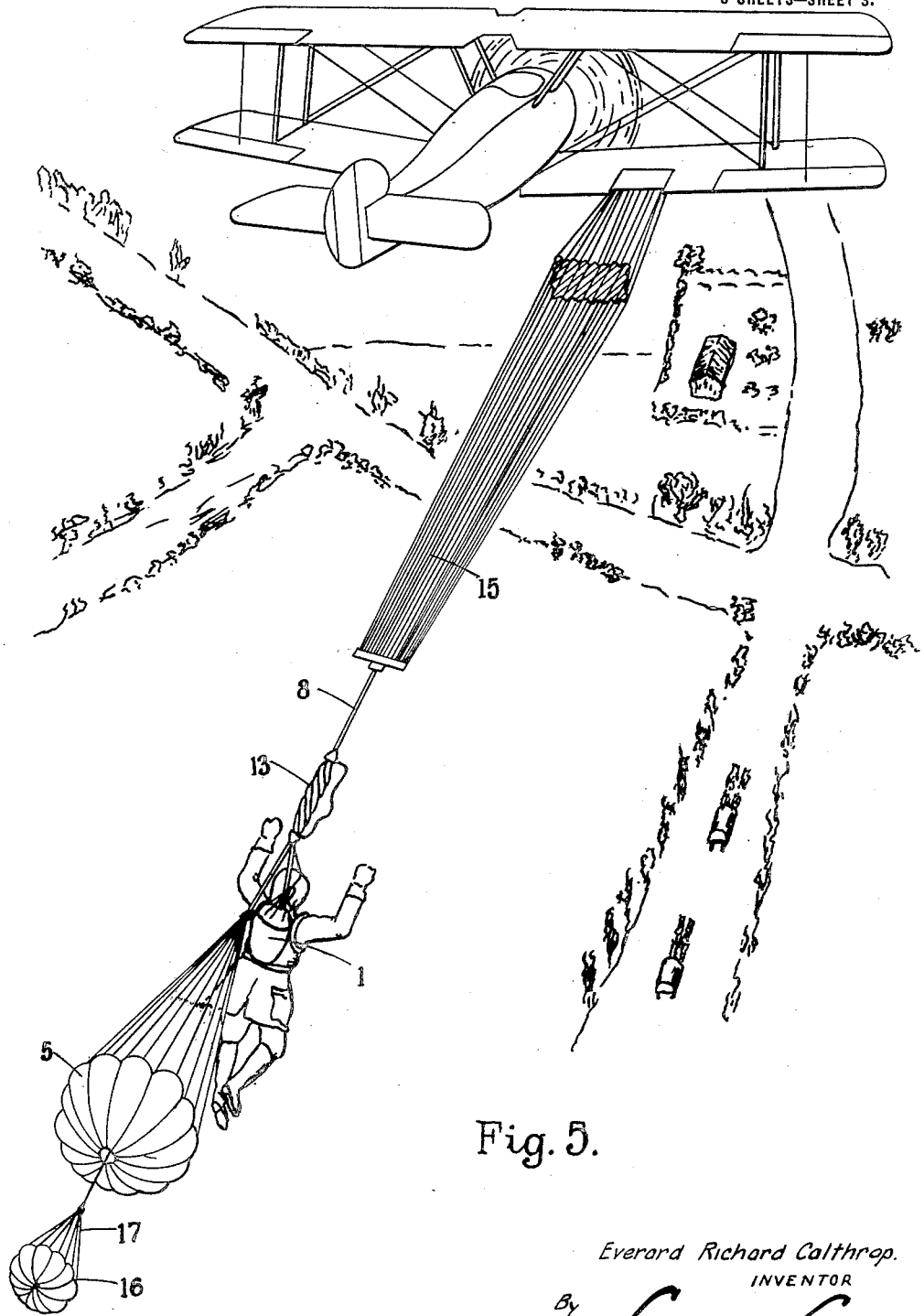

In Fig. 5 I have illustrated diagrammatically a slightly modified arrangement under this invention showing an aeroplane in the act of nose-diving and the aviator having jumped from the machine which is depicted as falling in advance of the aviator as would of course happen in such circumstances. In this figure the main or load supporting parachute indicated as a whole by the reference numeral 15 is of the kind wherein the parachute is housed within a container which normally forms part of the wing structure of the aeroplane.

In the modification shown the auxiliary parachute 5 is normally retained in the knapsack 1 as hereinbefore described with reference to the preceding figures of the drawings but in addition thereto I provide a smaller pilot parachute 16 which is carried in a breast pocket of the aviator's jacket or otherwise as found convenient.

The rigging 17 of said pilot parachute is attached to the apex of the auxiliary parachute 5 and when the aviator jumps from the aeroplane he abstracts the pilot parachute from his pocket by means of a cord attached to its apex or it may be abstracted automatically by means similar to that employed for abstracting the auxiliary parachute 5 from the knapsack 1. The pilot parachute will thus be caught by the air current and operate to abstract the auxiliary parachute 5 from the knapsack 1 whereupon the operation of launching the main parachute will be performed as hereinbefore described.

While I have described the preferred construction and operation of a parachute launching device under this invention I am aware that numerous changes may be effected without departing from the spirit of my invention and I therefore do not wish to be understood as limiting the scope of my claims by the positive terms employed in connection with the description.

I claim:

1. In a parachute launching device the combination with a main or load supporting parachute and a container therefor of means for attaching said container to the aircraft a knapsack positively carried upon the person of the aviator an auxiliary parachute nested in said knapsack and means for launching said auxiliary parachute as the aviator throws himself from the aircraft.

2. In a parachute launching device the combination with a main or load supporting parachute and a container therefor means for positively securing said container to the aircraft a knapsack positively secured to the person of the aviator an auxiliary parachute nested in said knapsack and means associated therewith and operable by the weight of the load for projecting said auxiliary parachute into the air current so as to create sufficient resistance to launch the load supporting parachute.

3. In a parachute launching device the combination with a main or load supporting parachute and a container therefor means for positively securing said container to the aircraft a knapsack positively secured to the person of the aviator an auxiliary parachute nested in said knapsack and means associated therewith and operable manually for projecting said auxiliary parachute into the air current so as to create sufficient resistance to launch the load supporting parachute.

4. In a parachute launching device the combination with a main or load supporting parachute a container therefor positively secured to the aircraft a knapsack positively secured to the person of the aviator a lining within said knapsack an auxiliary parachute nested within said lining and means for turning said lining inside out as the aviator throws himself from the aircraft to launch the auxiliary parachute and means associated with said auxiliary parachute for launching the load supporting parachute.

EVERARD RICHARD CALTHROP.